Sept. 29, 1970                    KOTO KASAI                    3,531,721
                  ELECTRIC METER HAVING A MAGNIFIED A SCALE
Filed April 3, 1968                                         3 Sheets-Sheet 1

*INVENTOR.*
Koto Kasai
BY Ernest G. Montague
   Attorney

Sept. 29, 1970  KOTO KASAI  3,531,721
ELECTRIC METER HAVING A MAGNIFIED A SCALE
Filed April 3, 1968  3 Sheets-Sheet 2

INVENTOR.
koto kasai
BY Ernest G. Montague
Attorney

INVENTOR.
koto kasai
BY Ernest G. Montague
Attorney

United States Patent Office 3,531,721
Patented Sept. 29, 1970

3,531,721
ELECTRIC METER HAVING A MAGNIFIED SCALE
Koto Kasai, 1–9 Yodogawa-cho, Fujimiya-shi, Shizuoka-ken, Japan
Filed Apr. 3, 1968, Ser. No. 718,446
Claims priority, application Japan, May 16, 1967, 42/31,081; Oct. 28, 1967, 42/69,266
Int. Cl. G01r 15/10
U.S. Cl. 324—132       2 Claims

ABSTRACT OF THE DISCLOSURE

In a deflection type electric meter means is provided to limit the deflection of the pointer to a predetermined range of the magnitude of the electric quantity to be measured to precisely indicate the quantity on a magnified scale. The means to limit the deflection of the pointer may be either a constant voltage diode or a mechanical spring device.

BACKGROUND OF THE INVENTION

This invention relates to an electric meter which can provide a fine indication of the measured quantity over a predetermined range and a coarse indication outside the range.

Batteries of motor cars are usually arranged to be charged by the floating charging system by generators driven by the engines of the cars. Thus, during normal running the generator supplies charging current to the battery as well as electric current to various loads on the car, but when the voltage of the engine driven generator decreases below a predetermined value, the battery comes to feed the loads.

In order to provide a satisfactory maintenance for the battery, it is necessary to constantly watch the terminal voltage of the battery so as to avoid the risk of over discharge and overcharge which cause shortening of the operating life of the battery. In the case of a battery utilized on motor cars and the like vehicles, decrease of the terminal voltage below about 11 volts usually causes overdischarge. Further, when the battery is connected in a floating charging system, because of the output voltage of the generator below about 10 volts charging is impossible. Accordingly, it is advantageous to maintain the terminal voltage of the generator in a range of about 12 to 20 volts although there is a tendency of slight overcharging.

For this reason, voltmeters utilized for the maintenance of car batteries are desirable to provide fine and accurate indications in the range of from 10 to 12 volts, but provide coarser indications in ranges below 10 volts and beyond 12 volts.

Various types of voltmeters have been used to measure the voltage of batteries including electromagnetic type, specific gravity type, photo-electric type and the like, but not one of them can provide fine and accurate indications over a predetermined limited range. In addition, they are not suitable for use on motor cars because of their complicated construction, large size, poor shock resistance, too wide indicating range and uniform scale.

SUMMARY OF THE INVENTION

Accordingly, it is an object of this invention to provide a novel electric meter which can provide a fine indication of the measured quantity over a predetermined range and a coarse indication outside this range.

It is another object of this invention to provide a compact voltmeter for car batteries which can provide fine and accurate indications over a limited range of the voltage, for example, from 10 to 12 volts.

In accordance with one aspect of this invention the above and other objects can be attained by providing a voltage measuring device comprising an electric meter connected across a battery to be measured, a constant voltage diode connected in series with the meter and adapted to cut off unnecessary low voltage, and a second diode connected in parallel with the meter to cut off unnecessary high voltage whereby to indicate by the meter only the voltage in a predetermined range on a magnified scale to obtain fine and accurate indications of the voltage.

According to another aspect of this invention there is provided an electric meter comprising a pointer, a moving coil energized by an electric quantity to be measured to deflect the pointer, a scale including a first portion of magnified scale corresponding to a predetermined range of magnitude of the electric quantity and a second portion of compressed scale corresponding to the magnitude of the electric quantity beyond the range, a lower limit stop corresponding to the lower end of the predetermined range, an upper limit stop corresponding to said second portion of the scale, a spring connected to said pointer and preloaded to apply a torque to the pointer corresponding to the torque imparted thereto by the moving coil at an input at the lower end of the predetermined range whereby to urge said pointer against the lower limit stop and a resilient means associated with said upper limit stop to damp the movement of the pointer when said electric quantity exceeds the predetermined range.

BRIEF DESCRIPTION OF THE DRAWING

With these and other objects in view which will become apparent in the following detailed description, the present invention will be clearly understood in connection with the accompanying drawings, in which.

DESCRIPTIONS OF THE PREFERRED EMBODIMENTS

Figure 1:
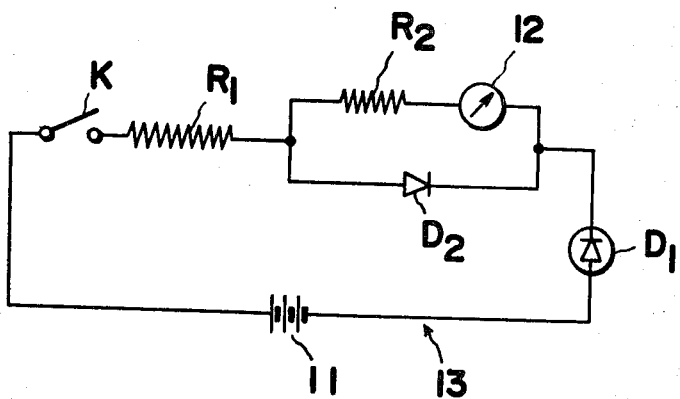
FIG. 1 is a schematic electrical diagram of one embodiment of this invention.

Referring now to FIG. 1 of the accompanying drawings, there is illustrated the electric meter of the present invention which can measure the voltage of a battery 11. For the purpose of description it is assumed herein that the rated voltage of the battery is 12 volts and that its final discharge voltage is 10.8 volts. A high sensitivity voltmeter 12 is included in a measuring circuit 13 in series with protective resistors $R_1$ and $R_2$ and a switch K across the battery 11. In accordance with this invention, a constant voltage diode $D_1$ is connected in series with the voltmeter 12 to cut off unnecessarily low voltage or voltages lower than the final discharge voltage of the battery. In this example, where the rated voltage of the battery 11 equals 12 volts, a Zener diode having a rated voltage of 11 volts is utilized as the diode $D_1$, the rated voltage being determined by the final discharge voltage 10.8 volts of the battery. Further, in accordance with this invention a second diode $D_2$, which may be a conventional rectifier diode, is connected in parallel with the series circuit including the voltmeter 12 and the resistor $R_2$ in order to cut off unnecessarily high voltages or voltages higher than the rated voltage of the battery 11. The diode $D_2$ is selected such that the sum of its forward voltage, the voltage drop across the series resistor $R_1$ and the voltage drop across the constant voltage diode $D_1$ equals the rated voltage of the battery or 12 volts. The value of the resistor $R_2$ connected in series with the voltmeter 12 is selected such that when the voltmeter fully deflects the sum of the voltage drop across the internal impedance of the voltmeter and that across the resistor $R_2$ equals to the forward voltage of the diode $D_2$.

Figure 2:
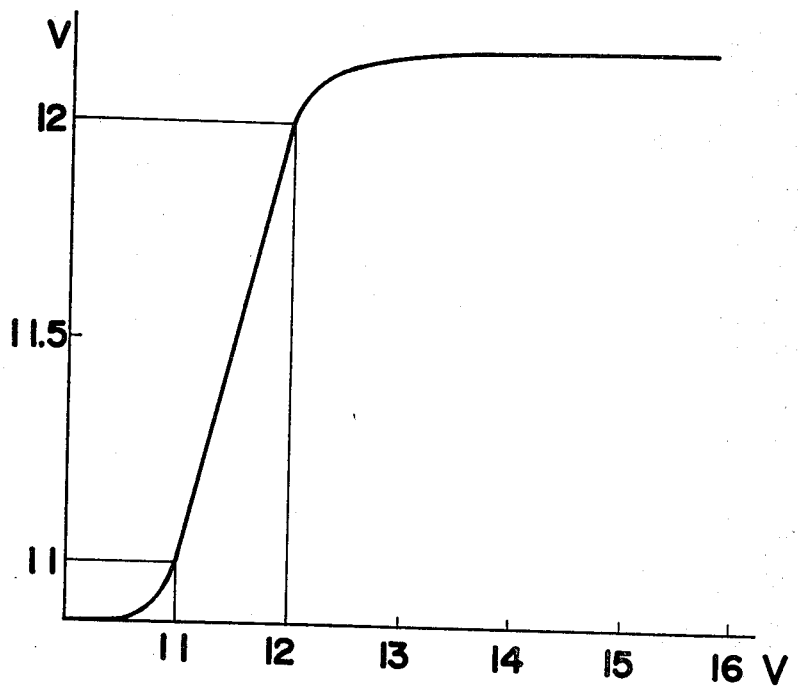
FIG. 2 is a voltage characteristic curve obtained by the circuit shown in FIG. 1.

Thus, in this embodiment, when the terminal voltage of the battery 11 reaches its rated voltage, or 12 volts, current will flow through a circuit including the resistor $R_1$, diode $D_2$ and Zener diode $D_1$ and the constant voltage determined by the forward voltage drop of the diode $D_2$ determines the voltage impressed across the series circuit including the resistor $R_2$ and the voltmeter 12. As a result, the meter 12 passes a constant current and when the terminal voltage of the battery 11 exceeds 12 volts the current through the diode $D_2$ increases abruptly due to the characteristic thereof thus bypassing current around meter 12. In this manner voltages exceeding the rated voltage of the battery are effectively cut out. The ordinate of FIG. 2 represents the voltage applied to the meter 12 and the abscissa the terminal voltage of the battery.

Figure 3:
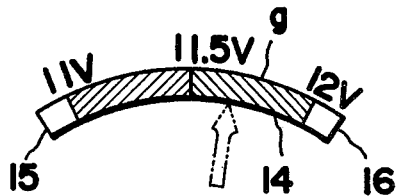
FIG. 3 shows one example of an indicating scale.

FIG. 3 shows a portion of the scale 14 of the high sensitivity voltmeter 12. The scale 14 comprises a region of magnified scale between the rated voltage 12 volts and 11 volts close to the final discharge voltage or 10.8 volts. On both sides of this region are compressed scales 15 and 16 which are required to correspond to inherent voltage changes due to the characteristic of the constant voltage diode $D_1$.

The operation of the voltage measuring circuit shown in FIG. 1 is as follows:

To measure the terminal voltage of the battery 11 switch K is closed to energize the measuring circuit 13. So long as the terminal voltage of the battery 11 is lower than the Zener, or 11 volts, of the constant voltage Zener diode $D_1$, or 11 volts current will be cut off by diode $D_1$ so that no current will flow through the voltmeter 12. However, as the terminal voltage of the battery 11 exceeds 11 volts, the constant voltage diode $D_1$ will become conductive owing to its Zener characteristic to create a substantially constant voltage or 11 volts of its terminal. Considering the parallel circuit including the voltmeter 12 and the diode $D_2$, the latter does not pass any appreciable current so long as the voltage across it is low, thus causing current to flow through the voltmeter 12. Thus, current flows through a circuit including resistors $R_1$ and $R_2$, voltmeter 12 and constant diode $D_1$, and the value of the current indicated by the meter increases in proportion to the increase in the terminal voltage of the battery 11.

As the terminal voltage of the battery reaches a voltage drop as determined by the diode $D_2$, or 12 volts, the diode $D_2$ will become conductive abruptly, thus maintaining the voltage impressed to voltmeter 12 to a constant value determined by the forward voltage drop of the diode $D_2$. Beyond 12 volts, surplus current is bypassed by the diode $D_2$ so that meter 12 passes the constant current which is determined by the forward voltage drop of diode $D_2$ thus indicating the constant voltage or 12 volts. In other words, the voltmeter 12 is protected against overcurrent.

Thus, current flows through the meter 12 proportional to the voltage during a range of only one volt which is the difference between 11 volts and 12 volts defining the effective discharge range of the battery 11, whereby to indicate current variations on the magnified scale 14 of the meter as shown in FIG. 3. Thus, even a slight variation in the terminal voltage of the battery 11 can be clearly and precisely indicated as a magnified variation. In this manner, as shown in FIG. 3, by taking 11.5 volts as the reference value for charging, whenever the meter indicates a voltage below 11.5 volts one can know that the battery requires charging. Thus, by closing the switch K whether the battery requires charging or not can be simply determined one can charge the battery to its most suitable condition before it discharges excessively.

Further, when this invention is applied to a floating charging system wherein a battery is constantly connected across a generator, the meter 12 clearly indicates such abnormal conditions as the decrease of the output voltage of the generator below a value necessary to charge the battery or the decrease of the voltage due to any fault of the measuring circuit, thus readily indicating faults of the generator or measuring circuit.

While in the foregoing embodiment, it was assumed that the rated voltage of the battery equals to 12 volts it will be clear that the invention can equally be applied to batteries of lower or higher rated voltages by proper selection of circuit components. Further, in order to decrease the physical dimension of the measuring apparatus it is advantageous to construct diodes utilized in the measuring circuit with a semiconductor material such as germanium or silicon but other elements can be substituted for these diodes. For example, a constant voltage discharge tube may be substituted for the constant voltage diode $D_1$ and a rectifier tube for the diode $D_2$.

According to the embodiment shown in FIG. 1, a constant voltage diode $D_1$ is connected in series with a meter included in the voltage measuring circuit for a battery to cut off unnecessary low voltages and a rectifier diode $D_2$ is connected in parallel with the meter to cut off unnecessary high voltages thus enabling the meter to indicate only voltages in a required range. In this manner, even a minute variation in the voltage is amplified and is then measured so that voltage measurement can be effected correctly and precisely for batteries whose difference between the rated voltage and the final discharge voltage is very small. In addition, by the circuit shown in FIG. 1 faults of the generator or associated circuits can be readily detected.

Figure 4:
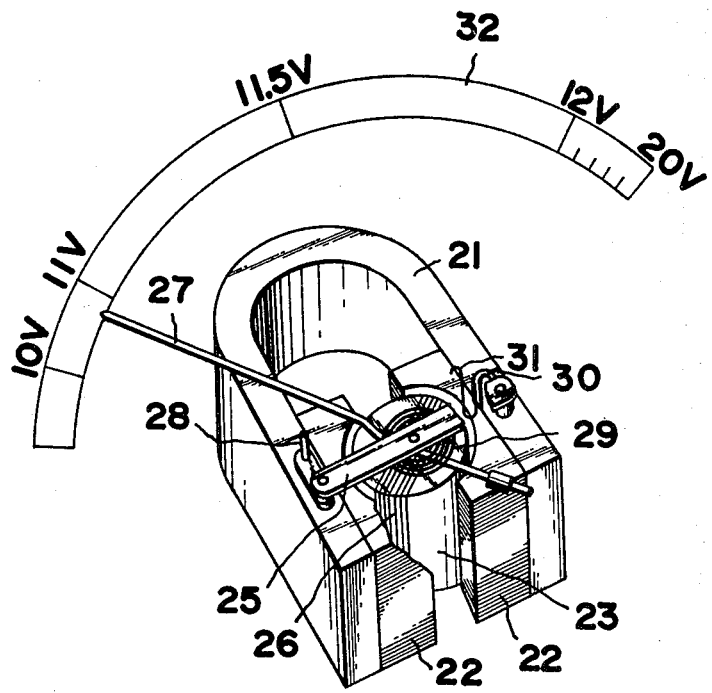
FIG. 4 is a perspective view of a modified indicating meter.
Figure 6:
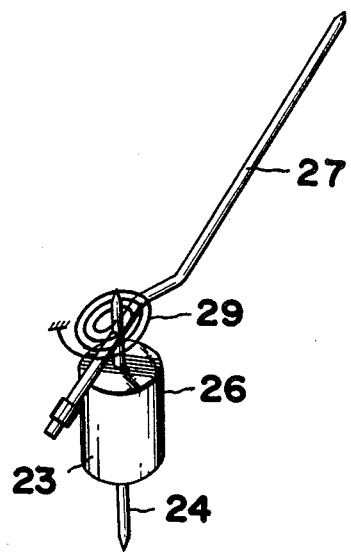
FIG. 6 is an enlarged perspective view of a pointer of the indicating meter shown in FIG. 4.

Referring now to FIG. 4 illustrating a modified embodiment of this invention wherein the indicating or display range of a voltmeter is limited by mechanical means. The voltmeter includes a U-shaped permanent magnet 21 having pole pieces 22, and a cylindrical armature 23 disposed in an air gap between pole pieces 22. Armature 23 includes a pivot shaft 24 at its center, as shown in FIG. 6, which is rotatably supported by a pair of bearing brackets, the upper bearing bracket 25 alone being shown in FIG. 4.

A moving coil 26 having substantially the same configuration as a cross-section of the armature along a plane including its diameter is wound upon the armature 23. A pointer 27 is secured to the top of the pivot shaft 24.

The construction hereinabove described is identical to that of a conventional moving coil type indicating meter. It is to be understood that the coil 26 is connected to a battery to be measured.

A spiral spring 29 is connected between the upper portion of the pivot shaft 24 and a suitably fixed point, for example, the bearing bracket 25 to apply a torque to the armature 23 and hence the pointer 27 so as to urge them toward a lower limit stop 28 disposed on the left hand end of the bearing bracket 25 so as to define the lower limit of the movement of the pointer 27. The spiral spring 29 is subjected to a pre-load such that a predetermined stress is applied to the spring when the pointer 27 engages the lower limit stop as will be more fully described below.

Figures 5A, 5B:
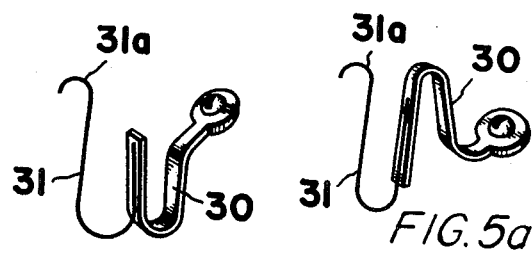
FIGS. 5(a) and 5(b) are perspective views of two embodiments of stops utilized in the meter shown in FIG. 4.

A stop 30 for determining the upper limit of the movement of the pointer 27 is provided at the right hand end of bearing bracket 25. As shown in FIG. 5(a) one leg of a letter U-shaped spring 31 is secured to the stop 30 by any suitable means such as spot welding or the like, the free leg of the spring being positioned in the path of movement of the pointer.

In the above described arrangement, the pre-load of the spiral spring 29 is selected in the following manner. More particularly, the pre-load is such that the torque imparted by this pre-load to the armature 23 and hence to the pointer 27 in the direction towards the lower limit stop 28 will be equal to the torque imparted to the pointer 27 by the coil 26 when a voltage of the value corresponding to the lower limit of measurement is applied thereto.

Further, the position of the free leg of U-shape spring 31 is selected such that this leg will assume the position of the pointer at the upper limit of the voltage range in which the values of the voltage are desired to be finely and precisely measured and that the leg will be perpendicular to the path of movement of the pointer, whereas the stiffness of the spring 31 is suitably selected dependent upon the degree of compressing the scale beyond the upper limit of the fine measuring range.

For example, in the case of a battery mounted on a motor car, the pre-load of the spiral spring 29 is selected to balance with the torque imparted to the pointer 27 when a voltage of 10 volts is applied to the moving coil 26, while the position of the free leg 31a of the U-shaped spring 31 is selected to correspond to the position of the pointer 27 when a voltage of 12 volts is applied.

As shown in FIG. 4, scale 32 of the meter is magnified in a range between 10 volts and 12 volts, for example, and compressed in ranges below 10 volts and beyond 12 volts.

The voltmeter shown in FIG. 4 operates in the following manner:

For the purposes of description it is assumed that the spiral spring 29 and the U-shaped spring 31 are set as above described in connection with a battery for motor cars. In this case, until the voltage reaches 10 volts the torque imparted to the pointer 27 is less than the pre-load of the spiral spring so that the pointer would not be deflected. However, when the voltage exceeds 10 volts, the torque imparted by coil 26 will exceed the pre-load to begin to deflect the pointer 27 to cause it to cooperate with the magnified region of the scale 32 to provide a fine and accurate indication of the voltage.

When the voltage exceeds 12 volts, the pointer 27 will engage the U-shaped spring 31 whereby braking force is applied to the movement of the pointer so that the pointer will not be moved in proportion to the increment of the torque created by coil 26. Thus, in the range between 12 and 20 volts, the movement of the pointer is damped and the pointer cooperates with the compressed scale thus providing coarse indications of the voltage at a relatively low accuracy.

As the voltage increases further, the free leg 31 of the letter U-shaped spring 31 will come to engage the upper limit stop 30, thus completely stopping the movement of the pointer 27.

Thus, according to this modification the voltmeter operates to provide fine and accurate indications of voltage only in the predetermined range but not to provide any indication in the range below a predetermined value. Such a characteristic is most suitable for the measurement of the voltage of batteries for motor cars and the like.

While the upper limit stop 30 shown in FIG. 4 is an inverted U-shape configuration as more clearly shown in FIG. 5(a) the stop 30 may be normal U-shaped configuration as shown in FIG. 5(b).

Although in this modification, the spiral spring 29 is pre-loaded to prevent the deflection of the pointer 27 in a range below a predetermined voltage value by proper selection of the stiffness of the spiral spring the pointer can also be prevented from deflecting.

Also it should be understood that means located at the upper stop for restraining the deflection of the pointer is not limited to the U-shaped spring shown in the drawing, but any other equivalent means may be utilized.

Further, the principle of this invention can also be applied to any deflection type electric meter such as an ammeter.

From the foregoing description it will be seen that the invention provides a novel deflection type electric meter which is simple in construction, inexpensive, small in size, and shock resistant. Thus, the novel electric meter is particularly suitable for use on vehicles such as motor cars, railway cars and the like to supervise the voltage of the battery mounted thereon.

While I have disclosed several embodiments of the present invention it is to be understood that these embodiments are given by example only, and not in a limiting sense.

I claim:

1. An electric meter comprising
a pointer including a tip,
a U-shaped permanent magnet having two pole pieces defining an air gap therebetween,
a cylindrical armature including an axial pivot shaft positioned between said pole pieces,
a pair of bearing brackets secured to said magnet across said poles and rotatably supporting said armature axial pivot shaft,
a moving coil wound upon said armature having substantially the same configuration as a cross-section of said armature along a plane including its diameter operatively disposed in the magnetic field of said permanent magnet and energized by an electric quantity to be measured to deflect said pointer,
said pointer substantially perpendicularly secured to said pivot shaft,
a scale adjacent the pivoting range of said tip of said pointer and including a first portion of magnified scale corresponding to a predetermined range of magnitude of said electric quantity and a second portion of compressed scale corresponding to the magnitude of said electric quantity beyond said range,
a lower limit stop mounted on said magnet adjacent said bearing bracket on the side thereof corresponding to the lower end of said predetermined range and in the pivoting range of said pointer such that as said pointer abuts said lower limit stop said tip points to said lower end of said predetermined range and said lower limit stop prevents said pointer from pivoting in a direction further down said scale,
a U-shaped upper limit stop mounted on said bearing bracket at a side of said magnet corresponding to the upper end of said second portion of said scale and in the pivoting range of said pointer such that as said pointer abuts said upper limit stop said tip points to said upper end of said second portion and said upper limit stop prevents said pointer from pivoting in a direction further up said scale,
a spiral spring operatively connected at one end to said pivot shaft and to said bearing bracket at the other end and adjacent one end of said armature coaxial thereto and pre-loaded to apply a torque to said pointer equal but opposite to the torque imparted thereto by said moving coil when a voltage of the value corresponding to the lower end of said predetermined range is applied thereto to urge said pointer against said lower limit stop, and
a U-shaped resilient means fixed at one of its legs to said upper limit stop and the other leg thereof positioned in the pivoting range of said pointer such that as said pointer abuts said other leg said tip points to the upper end of said predetermined range, the latter constituting the lower end of said second portion of compressed scale and said resilient means damping the pivoting movement of said pointer in a direction further up said scale within said second portion when said electric quantity exceeds said predetermined range until said pointer abuts said upper limit stop.

2. The electric measuring device, as set forth in claim 1, wherein
said U-shaped resilient means is a U-shaped spring and oriented such that said U-shaped spring is perpendicular to and in the path of the direction of movement of said pointer.

References Cited

UNITED STATES PATENTS

| | | | |
|---|---|---|---|
| 1,783,559 | 12/1930 | Cone | 324—131 |
| 2,284,423 | 5/1942 | Hansell | 324—132 |
| 2,571,458 | 10/1951 | Lawrence et al. | |
| 3,125,718 | 3/1964 | Race | 324—131 XR |
| 3,390,332 | 6/1968 | Rappoccio | 324—131 XR |

FOREIGN PATENTS 9,351   4/1907   Great Britain.

ALFRED E. SMITH, Primary Examiner